United States Patent
Yokoyama (10) Patent No.: US 11,268,465 B2
(45) Date of Patent: Mar. 8, 2022

(54) INTERNAL COMBUSTION ENGINE CONTROL METHOD AND CONTROL DEVICE

(71) Applicant: NISSAN MOTOR CO., LTD., Yokohama (JP)

(72) Inventor: Jin Yokoyama, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/049,436

(22) PCT Filed: Apr. 26, 2018

(86) PCT No.: PCT/IB2018/000530
§ 371 (c)(1),
(2) Date: Oct. 21, 2020

(87) PCT Pub. No.: WO2019/207330
PCT Pub. Date: Oct. 31, 2019

(65) Prior Publication Data
US 2021/0079860 A1 Mar. 18, 2021

(51) Int. Cl.
*F01N 3/00* (2006.01)
*F02D 41/02* (2006.01)
*F01N 3/023* (2006.01)
*F02D 41/12* (2006.01)

(52) U.S. Cl.
CPC ........... *F02D 41/029* (2013.01); *F01N 3/023* (2013.01); *F02D 41/12* (2013.01); *F02D 2200/0802* (2013.01)

(58) Field of Classification Search
CPC .................. F02D 41/029; F02D 41/12; F02D 2200/0802; F01N 3/023
See application file for complete search history.

(56) References Cited

U.S. PATENT DOCUMENTS

| | | | | |
|---|---|---|---|---|
| 9,429,053 | B2* | 8/2016 | Keppeler | F02D 41/029 |
| 10,677,128 | B2* | 6/2020 | Nakada | F01N 3/206 |
| 10,690,073 | B2* | 6/2020 | Nakada | F02D 41/024 |
| 10,753,298 | B2* | 8/2020 | Suzuki | F02D 41/144 |
| 11,035,267 | B2* | 6/2021 | Nishimoto | B01D 46/42 |
| 2005/0262827 | A1* | 12/2005 | Ichimoto | F02D 41/0235 60/277 |
| 2010/0205942 | A1* | 8/2010 | Fujiwara | F02D 41/029 60/285 |

(Continued)

FOREIGN PATENT DOCUMENTS

| | | | |
|---|---|---|---|
| JP | 2002-188491 A | 7/2002 | |
| JP | 2011-99451 A | 5/2011 | |

(Continued)

*Primary Examiner* — Matthew T Largi
(74) *Attorney, Agent, or Firm* — Foley & Lardner LLP (57) ABSTRACT

An internal combustion engine (1) is provided with an exhaust particulate filter (6) disposed in an exhaust passage (4). When the particulate deposition amount and the temperature of the exhaust particulate filter (6) meet a predetermined excessive temperature rise condition, fuel cut during deceleration is prohibited. When a predetermined release condition is satisfied during the prohibition of the fuel cut, the fuel cut is temporarily permitted to perform the regeneration of the exhaust particulate filter (6).

8 Claims, 4 Drawing Sheets

(56) References Cited

U.S. PATENT DOCUMENTS

| | | | |
|---|---|---|---|
| 2015/0369153 A1* | 12/2015 | Tsu | F02D 41/123 60/285 |
| 2017/0051652 A1* | 2/2017 | De Smet | F01N 3/023 |
| 2018/0106206 A1* | 4/2018 | Tsunoda | B60W 20/16 |
| 2018/0216552 A1* | 8/2018 | Yokoi | B60W 10/26 |

FOREIGN PATENT DOCUMENTS

| | | |
|---|---|---|
| JP | 2014-185562 A | 10/2014 |
| JP | 2015-010470 A | 1/2015 |
| JP | 2017-155707 A | 9/2017 |
| WO | WO 2014/122778 A1 | 8/2014 |

* cited by examiner

INTERNAL COMBUSTION ENGINE CONTROL METHOD AND CONTROL DEVICE

TECHNICAL FIELD

The present invention relates to a control method and a control device of an internal combustion engine provided with an exhaust particulate filter for collecting exhaust particulates which is disposed in an exhaust passage.

BACKGROUND TECHNOLOGY

In an internal combustion engine, such as a gasoline engine, for performing combustion mainly at a theoretical air-fuel ratio, an exhaust particulate filter for collecting exhaust particulates in exhaust gas is provided to an exhaust passage. This exhaust particulate filter is regenerated by the combustion of the exhaust particulates deposited in the exhaust particulate filter during operation. For example, oxygen is supplied to the exhaust particulate filter during coast travel with fuel cut, and consequently, the combustion of the exhaust particulates occurs. Here, when the exhaust particulate deposition amount in the exhaust particulate filter is large and the temperature of the exhaust particulate filter is high, if a large amount of oxygen is supplied to the exhaust particulate filter by the fuel cut during deceleration, the excessive temperature rise of the exhaust particulate filter may occur due to the rapid combustion of the exhaust particulates.

In a patent document 1, to avoid such excessive temperature rise of the exhaust particulate filter, when the deposition amount in the exhaust particulate filter exceeds a predetermined value and the temperature of the exhaust particulate filter exceeds a predetermined temperature, fuel cut during deceleration is prohibited. In addition, in the patent document 1, in a first stage before the deposition amount and the temperature of the exhaust particulate filter become a level to prohibit the fuel cut, a weak lean control in which an air-fuel ratio is set to a weak lean air-fuel ratio is carried out.

However, similar to the patent document 1, in the configuration in which the fuel cut during deceleration is prohibited when the exhaust particulate deposition amount is large and the temperature of the exhaust particulate filter is high, if the operation is carried out in a mode in which the ratio of the full operation is high, there is almost no opportunity to regenerate the exhaust particulate filter.

In addition, if the operation in which, by the weak lean control, the air-fuel ratio is set to a lean air-fuel ratio is continued, the generation of NOx and the treatment of NOx become new problems.

PRIOR ART DOCUMENT

Patent Document

Patent Document 1: Japanese Patent Application Publication 2011-99451

SUMMARY OF THE INVENTION

In the present invention, in a method and a device for controlling an internal combustion engine which performs combustion mainly at a theoretical air-fuel ratio, and which is provided with an exhaust particulate filter disposed in an exhaust passage, an exhaust particulate deposition amount and a temperature of the exhaust particulate filter are detected or estimated, fuel cut during deceleration is prohibited when the exhaust particulate deposition amount and the temperature meet a predetermined excessive temperature rise condition, and temporary oxygen supply to the exhaust particulate filter is performed when a predetermined release condition is further satisfied during the fuel cut prohibition.

For example, the temporary supply of oxygen to the exhaust particulate filter can be carried out by the fuel cut of all of the cylinders, a part of the cylinders or secondary air supply. By this temporary oxygen supply, the exhaust particulates deposited in the exhaust particulate filter are burnt. If the supply time of oxygen is long, the temperature of the exhaust particulate filter (bed temperature) excessively rises, and the exhaust particulate deposition amount and the temperature meet an excessive temperature rise condition. There is therefore concern that the exhaust particulate filter is thermally damaged. However, if the temporary oxygen supply is carried out in a short time, the rise of the bed temperature becomes relatively small, and it does not excessively rise to a temperature which causes the thermal damage.

Therefore, when the exhaust particulate deposition amount and the temperature meet a predetermined excessive temperature rise condition, while fuel cut is basically prohibited, if a predetermined release condition is satisfied, the oxygen supply is temporarily permitted, and both of the avoidance of the excessive temperature rise and the ensuring of the regeneration opportunity can be achieved.

MODE FOR IMPLEMENTING THE INVENTION

In the following, one embodiment of the present invention will be explained in detail based on the drawings.

Figure 1:
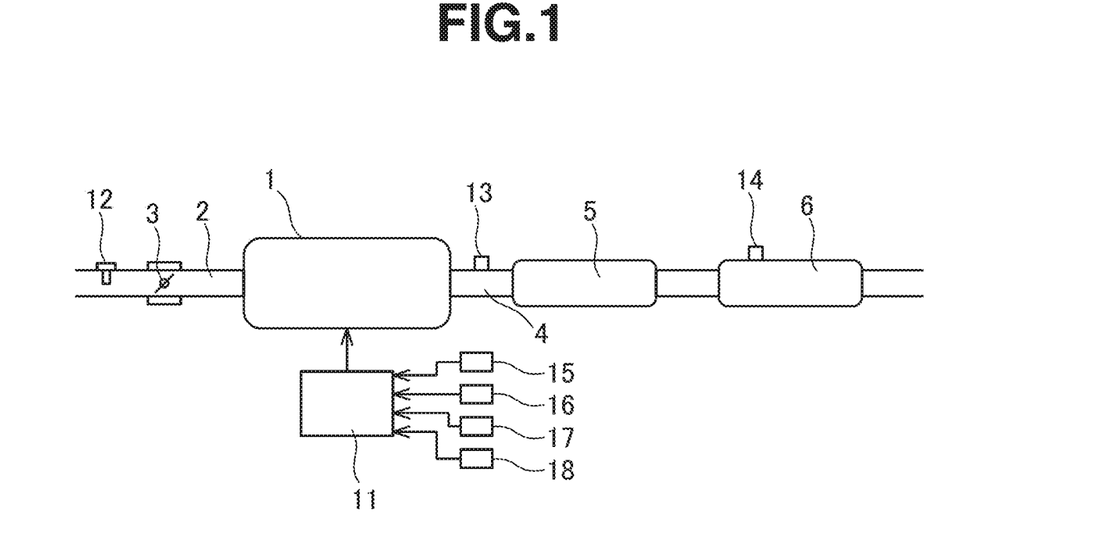
FIG. 1 is an illustrative view of the system configuration of an internal combustion engine to which the present invention is applied.

FIG. 1 shows a system diagram of an embodiment of an internal combustion engine 1 to which control according to the present invention is applied. Internal combustion engine 1 is one performing combustion mainly at a theoretical air-fuel ratio (stoichiometric air-fuel ratio), and constituted of, for example, a four stroke cycle spark ignition type gasoline engine. Each cylinder of internal combustion engine 1 is provided with a fuel injection valve, which is not shown in the drawings, for supplying fuel to the inside of a cylinder or an intake port, and with an ignition plug for performing the ignition of mixture formed inside the cylinder, ignition plug which is not shown in the drawings.

An electronic control type throttle valve 3 of which the opening degree is controlled by a control signal from an engine controller 11 is disposed in an intake passage 2 of internal combustion engine 1. An air flow meter 12 for detecting the intake air amount of internal combustion engine 1 is provided on the upstream side of throttle valve 3, and an air cleaner which is not shown in the drawings is provided on the further upstream side of air flow meter 12.

A catalyst apparatus 5 composed of three-way catalyst is disposed in an exhaust passage 4 of internal combustion engine 1, and an exhaust particulate filter 6 (so-called GPF) for collecting and removing exhaust particulates contained in exhaust gas is disposed on the downstream of catalyst apparatus 5. On the downstream side from exhaust particulate filter 6, exhaust passage 4 is opened to the atmosphere via a silencer which is not shown in the drawings. On the upstream side from catalyst apparatus 5 in exhaust passage 4, an air-fuel ratio sensor 13 for detecting an exhaust gas air-fuel ratio is disposed.

Exhaust particulate filter 6 is composed of, for example, a so-called wall flow type monolithic ceramic filter formed so as to have a plurality of fine passages of which the end portions are alternately sealed. In a preferable example, exhaust particulate filter 6 has the three-way catalyst, so as to also function as a three-way catalyst apparatus on the downstream side which is combined with catalyst apparatus 5 on the upstream side. In addition, in another example, exhaust particulate filter 6 is equipped with a filter temperature sensor 14 for detecting the temperature of the ceramic filter (bed temperature). Moreover, an upstream-side temperature sensor and a downstream-side temperature sensor for detecting gas temperature may be provided on the upstream side and the downstream side of exhaust particulate filter 6 respectively, so as to estimate the bed temperature from detection values of these two temperature sensors, without directly detecting the bed temperature. In another way, the temperature of exhaust particulate filter 6 can be estimated from other parameters, such as an operation condition of internal combustion engine 1 and the history of the operation condition, without detecting the temperature of exhaust particulate filter 6 by the temperature sensor.

Detection signals of various sensors, such as, in addition to the above air flow meter 12, air-fuel ratio sensor 13 and filter temperature sensor 14, a crank angle sensor 15 for detecting the rotation speed of internal combustion engine 1, a water temperature sensor 16 for detecting the temperature of cooling water, an accelerator opening sensor 17 for detecting the depression amount of the accelerator pedal operated by a driver and a vehicle speed sensor 18 for detecting vehicle speed, are input to engine controller 11. Engine controller 11 is configured to optimally control, based on those detection signals, a fuel injection amount and an injection timing by the fuel injection valve, which is not shown in the drawings, an ignition timing by the ignition plug, and the opening degree of throttle valve 3.

Basically, the air-fuel ratio of internal combustion engine 1 is controlled with the theoretical air-fuel ratio as a target air-fuel ratio by feedback-controlling the fuel injection amount from the fuel injection valve based on the detection signal of air-fuel sensor 13. Under this theoretical air-fuel ratio, three-way catalysis can be obtained by catalyst apparatus 5.

In addition, engine controller 11 has a fuel cut control function for performing fuel cut at a predetermined deceleration time of internal combustion engine 1. For example, when the driver operates the opening degree of the accelerator pedal to full closing during vehicle travel, if a predetermined fuel cut condition (for example, the cooling water temperature is a temperature after completing the worm-up of the engine, the vehicle speed is equal to or greater than a predetermined threshold value, the rotation speed of the engine is equal to or greater than a predetermined threshold value) is satisfied, engine stop, that is, the fuel cut is executed. Then, as a fuel cut recovery condition, for example, when any one of the depression of the accelerator pedal, the lowering of the vehicle speed to a predetermined threshold value or less and the lowering of the rotation speed of the engine to a predetermined threshold value or less is detected, fuel supply is restarted, that is, the fuel cut recovery is executed.

In this way, when such fuel cut is performed, oxygen taken in a combustion chamber flows out to exhaust passage 4 without being consumed, and consequently, if the temperature of exhaust particulate filter 6 is high to a certain extent, the exhaust particulates deposited in exhaust particulate filter 6 is burnt and removed. That is, exhaust particulate filter 6 is regenerated. However, in a state in which a large amount of the exhaust particulates is deposited in exhaust particulate filter 6 and the temperature of exhaust particulate filter 6 is quite high, if the fuel cut is executed, a large amount of the exhaust particulates is rapidly burnt, as a result of which the temperature of exhaust particulate filter 6 excessively rises, and it reads to thermal damage. Therefore, as will be explained in detail below, the fuel cut is limited in accordance with the state of exhaust particulate filter 6.

In addition, in the embodiment explained below, temporary oxygen supply during the prohibition of the fuel cut is realized by temporarily releasing the prohibition of the fuel cut.

Figure 2:
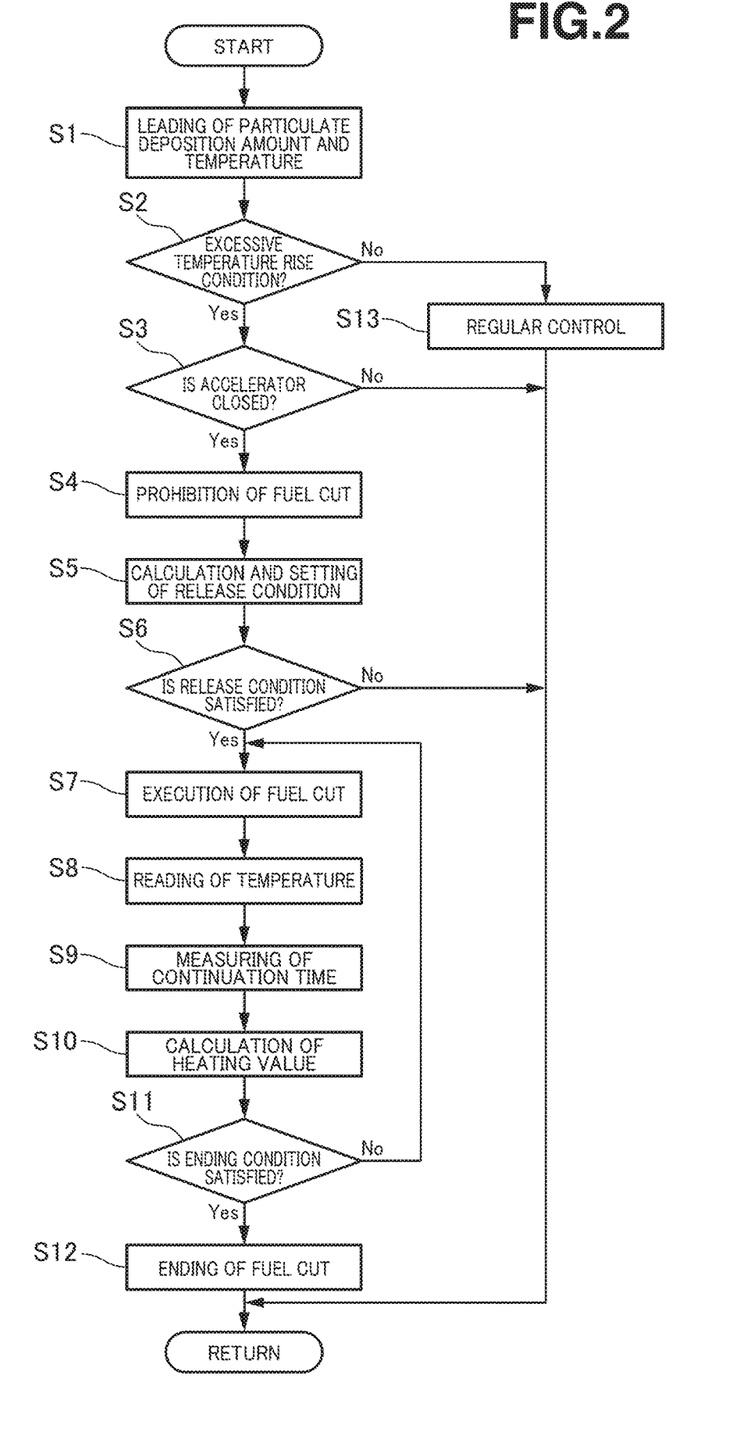
FIG. 2 is a flowchart showing the flow of control executed by an engine controller.

FIG. 2 is a flowchart showing the flow of the control of the fuel cut during deceleration which is executed by engine controller 11. For example, the routine shown in this flowchart is repeatedly executed at every predetermined short time.

In a step 1, the exhaust particulate deposition amount and the temperature (bed temperature) of exhaust particulate filter 6 are read. The current exhaust particulate deposition amount in exhaust particulate filter 6 is successively estimated by another routine, which is not shown in the drawings, during the operation of internal combustion engine 1. For example, the production amount of the exhaust particulates per unit time obtained from the operation condition (load and rotation speed) of internal combustion engine 1 is successively added, and on the other hand, the amount of the exhaust particulates, which is assumed to be reduced by the combustion under the operation condition in which the exhaust particulates are burnt, is successively subtracted, and then the current exhaust particulate deposition amount is estimated. When it is determined that exhaust particulate filter 6 is completely regenerated by the combustion of the exhaust particulates, the estimation value of the exhaust particulate deposition amount may be reset to 0. In one example, the detection value of filter temperature sensor 14 is used as the temperature of exhaust particulate filter 6.

Figure 3:
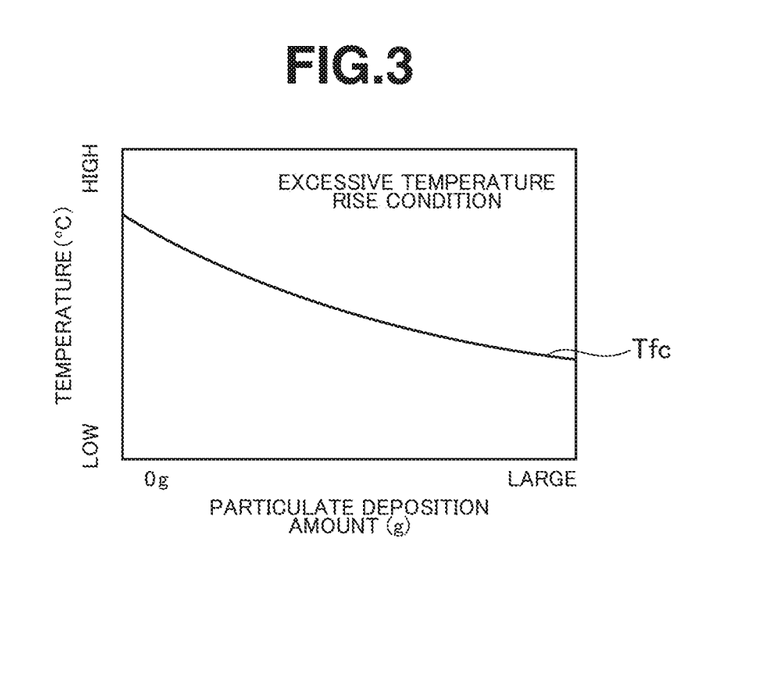
FIG. 3 is a characteristic diagram showing an area of an excessive temperature rise condition in which an exhaust particulate deposition amount and a temperature are used as parameters.

In a step 2, it is determined whether or not these exhaust particulate deposition amount and temperature meet a predetermined excessive temperature rise condition in which excessive temperature rise might occur due to the execution of the fuel cut. Specifically, the exhaust particulate deposition amount and the temperature are used as parameters, and as shown in FIG. 3, an area which becomes the excessive temperature rise condition is defined so as to be a characteristic in which the larger the exhaust particulate deposition amount is, the lower temperature threshold value Tfc is, and based on the characteristic of FIG. 3, it is determined whether or not the exhaust particulate deposition amount and the temperature of exhaust particulate filter 6 meet the excessive temperature rise condition. That is, assuming that the whole amount of the exhaust particulates deposited in exhaust particulate filter 6 is burnt with the fuel cut, the larger the exhaust particulate deposition amount is, the larger the temperature rise at the time of the regeneration is, and temperature threshold value Tfc is therefore set to a relatively low temperature. In the step 2, for example, temperature threshold value Tfc defined based on the exhaust particulate deposition amount of exhaust particulate filter 6 is compared with a detected temperature, and if the detected temperature exceeds temperature threshold value Tfc corresponding to the exhaust particle deposition amount at that time, it is determined that the excessive temperature rise condition is satisfied. In addition, an exhaust particulate deposition amount threshold value which becomes a limit value, which is defined in accordance with the temperature of exhaust particulate filter 6, may be compared with an estimated exhaust particulate deposition amount at that time.

If the exhaust particulate deposition amount and the temperature do not meet the excessive temperature rise condition, the process proceeds to a step 13, and as a fuel cut control, a regular control is continued. That is, regular fuel cut during deceleration and fuel cut recovery after that are permitted. Therefore, when the driver operates the opening degree of the accelerator pedal to full closing during vehicle travel, the fuel cut is executed subject to a condition in which another condition is satisfied. Accordingly, as mentioned above, the exhaust particulates deposited in exhaust particulate filter 6 are burnt, and then exhaust particulate filter 6 is regenerated.

If the exhaust particulate deposition amount and the temperature meet the excessive temperature rise condition, the process proceeds from the step 2 to a step 3, and it is continuously determined whether or not the opening degree of the accelerator pedal becomes full closing. In other words, it is determined whether or not a deceleration operation that becomes an object of the fuel cut is performed. If the opening degree of the accelerator pedal is not changed to full closing, the routine this time is ended.

When, in the step 3, it is determined that the deceleration operation is performed, the process proceeds to a step 4, and the fuel cut is prohibited to avoid the excessive temperature rise accompanying the combustion of the exhaust particulates.

Next, the process proceeds from the step 4 to a step 5, and a release condition for permitting the temporary oxygen supply to exhaust particulate filter 6 is obtained. Then, in a step 6, it is determined whether or not the release condition is satisfied. In this embodiment, the release condition is satisfied when the following three conditions are simultaneously satisfied (that is, "AND condition").

(1) The temperature of exhaust particulate filter 6 (bed temperature) is less than a predetermined prohibition release temperature Tfc1.

(2) The number of times of prohibition release is a predetermined number of times (in the present embodiment, for example, one time) or less in one time of coast travel.

(3) A predetermined time elapses from the previous prohibition release (for details, either of start point and end point of the prohibition release).

Figure 4:
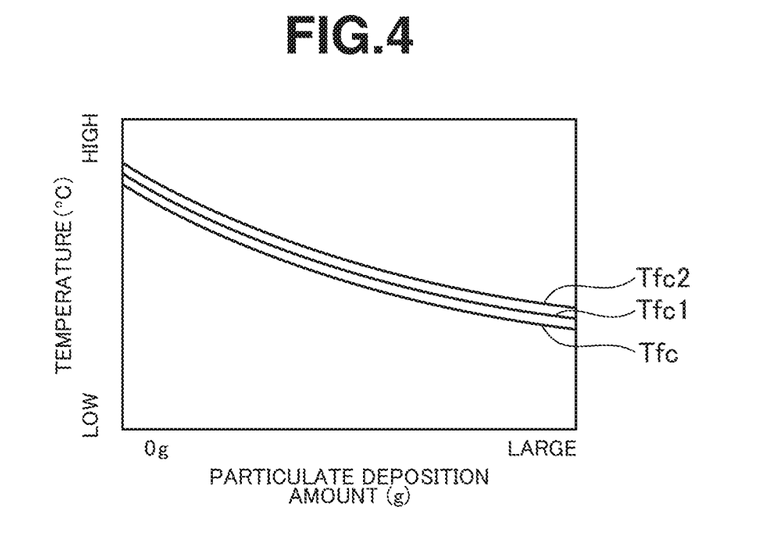
FIG. 4 is a characteristic diagram showing the characteristics of a prohibition release temperature Tfc1 and a release end temperature Tfc2.

Prohibition release temperature Tfc is a bed temperature at which the excessive temperature rise of exhaust particulate filter 6 does not occur if the fuel cut is performed in a short time (that is, a short-time oxygen supply). Although it may be a fixed value, in this embodiment, as shown in FIG. 4, prohibition release temperature Tfc1 is previously set to a value in accordance with the exhaust particulate deposition amount, so as to be a temperature slightly higher than temperature threshold value Tfc according to the exhaust particulate deposition amount. That is, the characteristic of prohibition release temperature Tfc1 is one obtained by adding a predetermined temperature difference to temperature threshold value Tfc at which the prohibition of basic fuel cut is performed.

The conditions of (2) and (3) are set in consideration of a possibility that, even in the short-time oxygen supply, the excessive temperature rise occurs if the frequency of the fuel cut is high. By the condition of (3), an interval required for returning the bed temperature raised accompanying the fuel cut to an approximately original temperature is given.

Therefore, in the step 5, prohibition release temperature Tfc1 according to the exhaust particulate deposition amount at that time is set for the condition of (1), "1" that is allowable frequency in one time of coast travel is set for the condition of (2), and a predetermined time (for example, a fixed value) which becomes an interval is set for the condition of (3).

Then, in the step 6, while determining the condition of (1) by comparing the temperature of exhaust particulate filter 6 at that time with prohibition release temperature Tfc1, the conditions of (2) and (3) are determined, and finally, when the conditions of (1), (2) and (3) are simultaneously satisfied, it is determined that temporary release of the prohibition of the fuel cut (that is, temporary oxygen supply) can be performed.

If the determination in the step 6 is "NO", the routine is ended. The prohibition of the fuel cut is therefore continued.

If the determination in the step 6 is "YES", the step proceeds from the step 6 to a step 7, and the fuel cut prohibition is released. That is, the fuel cut is performed.

Then, in steps 8 to 11, the condition for ending the temporary release of this fuel cut prohibition is determined. In the step 8, the temperature of exhaust particulate filter 6 (bed temperature) is read. Normally, the oxidation and the combustion of the exhaust particulates occur accompanying the fuel cut, and consequently, the temperature of exhaust particulate filter 6 rises. In the step 9, a time period when the fuel cut prohibition is released, that is, a continuation time of the fuel cut is measured. In the step 10, the heating value (integrated value) generated by the combustion of the exhaust particulates due to the fuel cut this time is obtained. The heating value of the exhaust particulates is estimated from, for example, the exhaust particulate deposition amount and the amount of oxygen.

In the step 11, if any one of the following three conditions (4) to (6) is satisfied (that is, "OR" condition), it is determined that the ending condition for ending the temporary release of the fuel cut prohibition is satisfied.

(4) The time elapsing from the release (that is, the continuation time of the fuel cut) is equal to or longer than a predetermined time.

(5) The heating value (integrated value) by the combustion of the exhaust particulates is equal to or greater than a predetermined value.

(6) The temperature of exhaust particulate filter 6 (bed temperature) is equal to or higher than a predetermined release end temperature Tfc2.

The predetermined time in the condition (4) is set to a time within a range in which the excessive temperature rise of exhaust particulate filter 6 having a temperature near prohibition release temperature Tfc1, excessive temperature rise which is caused by the combustion of the exhaust particulates accompanying the fuel cut, does not occur.

As will be mentioned below, the heating value in the condition of (5) is one estimated considering that the peak of the temperature rise of exhaust particulate filter 6 occurs lagging behind the ending of the fuel cut. That is, when the heating value is large, it is necessary to end the fuel cut before the temperature detected by filter temperature sensor 14 reaches release end temperature Tfc2.

Release end temperature Tfc2 in the condition of (6) is one set as a temperature at which the excessive temperature rise of exhaust particulate filter 6 does not occur, in consideration of the temperature rise which occurs lagging behind the ending of the fuel cut. Although it may be a fixed value, in this embodiment, as shown in FIG. 4, release end temperature Tfc2 is previously set to a value in accordance with the exhaust particulate deposition amount, so as to be a temperature slightly higher than prohibition release temperature Tfc1 according to the exhaust particulate deposition amount. That is, the characteristic of release end temperature Tfc2 is one obtained by adding a predetermined temperature difference to prohibition release temperature Tfc1.

When any of these conditions is not satisfied, the determination in the step 11 becomes "NO", and in this case, the process is returned to the step 7, and the fuel cut is continued.

If any of the conditions of (4) to (6) is satisfied, the determination in the step 11 becomes "YES". In this case, the process proceeds from the step 11 to a step 12, and the release of the fuel cut prohibition is ended. Therefore the fuel cut is ended even in coast travel.

In this way, in the above embodiment, if the exhaust particulate deposition amount and the temperature (bed temperature) in exhaust particulate filter 6 meet a predetermined excessive temperature rise condition, the fuel cut during deceleration is basically prohibited, and consequently, the excessive temperature rise of exhaust particulate filter 6 caused by the fuel cut and its thermal damage are suppressed. However, even if the exhaust particulate deposition amount and the temperature meet the excessive temperature rise condition, if the above-mentioned release conditions of (1) to (3) are satisfied, temporary fuel cut (that is, fuel cut in a short time) is executed. With this, exhaust particulate filter 6 is partially regenerated. Therefore, even in a case where the driver continues a high load operation for a long time, an opportunity to partially regenerate exhaust particulate filter 6 is obtained accompanying deceleration operation, and the excessive deposition of the exhaust particulates is suppressed.

FIG. 5 is a time chart showing a change in the bed temperature of exhaust particulate filter 6, accompanying the fuel cut during deceleration. In this time chart, as a premise, the exhaust particulate deposition amount is relatively large and the bed temperature during deceleration (immediately before the starting of the fuel cut) is at a temperature between the above-mentioned temperature threshold value Tfc and prohibition release temperature Tfc.

Figure 5A:
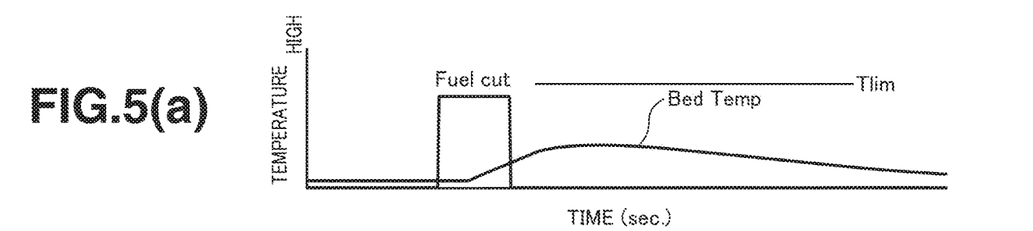
FIG. 5 is a characteristic diagram showing a change in a bed temperature accompanying fuel cut during deceleration by comparing an embodiment (a) with a comparative embodiment (b).
Figure 5B:
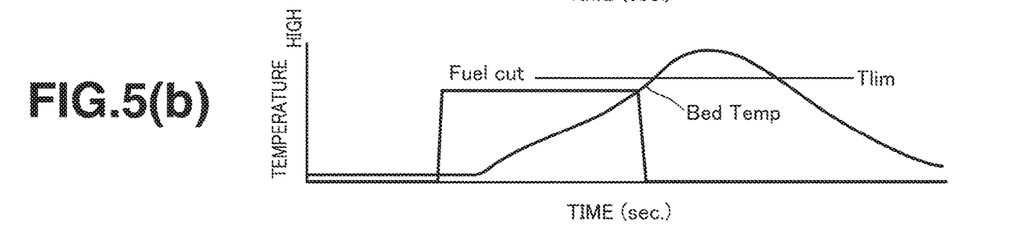

In FIG. 5 (b), as a comparative embodiment, there is shown a characteristic in a case where regular fuel cut is performed during deceleration, and the fuel cut is continued from the starting of deceleration until a regular fuel cut recovery condition (for example, the lowering of the vehicle speed mentioned above) is satisfied. Since the combustion of the deposited exhaust particulates occurs accompanying the fuel cut, the bed temperature starts rising lagging slightly behind the fuel cut start. After that, the temperature rise is continued even after the ending of the fuel cut, and the peak of the temperature appears after the ending of the fuel cut. In this comparative embodiment, after the ending of the fuel cut, the bed temperature exceeds a limit temperature Tlim at which the thermal damage of exhaust particulate filter 6 occurs. Here, in the present specification, "excessive temperature rise" means the exceeding of this limit temperature Tlim.

In FIG. 5 (a), as an embodiment, there is shown a characteristic in a case where the fuel cut prohibition is temporarily released during deceleration, to perform the fuel cut in a short time. In this case, since the total amount of oxygen supplied to exhaust particulate filter 6 becomes relatively small, the rising of the temperature is gentle, and the peak of the temperature which appears after the ending of the fuel cut becomes low. Therefore, the bed temperature does not exceed limit temperature Tlim at which the thermal damage of exhaust particulate filter 6 occurs.

In addition, in the embodiment shown in FIG. 5 (a), since, as a premise, the bed temperature during deceleration (immediately before the starting of the fuel cut) is at a temperature between the above-mentioned temperature threshold value Tfc and prohibition release temperature Tfc1, the temporary fuel cut is permitted at substantially the same time as the deceleration operation by the driver. However, although the above-mentioned release condition is not satisfied at the time of the starting of deceleration, when the release condition is satisfied during deceleration (coast travel) due to the lowering of the temperature of exhaust particulate filter 6 by deceleration, from that time, the temporary fuel cut may start.

As a means for the temporary oxygen supply at the time when the release condition is satisfied, the fuel cut of all cylinders or a part of the cylinders can be performed. As to the fuel cut of a part of the cylinders, as compared with the fuel cut of all of the cylinders, the supply amount of oxygen to exhaust particulate filter 6 can be suppressed so as to be small. In another way, a secondary air introducing apparatus for allowing to introduce secondary air may be provided on the upstream side of catalyst apparatus 5 or on the upstream side of exhaust particulate filter 6 in exhaust passage 4, so as to temporarily supply oxygen by using this secondary air introducing apparatus.

The invention claimed is:
1. A method for controlling an internal combustion engine which performs combustion mainly at a theoretical air-fuel ratio, the internal combustion engine being provided with an exhaust particulate filter disposed in an exhaust passage, the method comprising:
  detecting or estimating an exhaust particulate deposition amount and a temperature of the exhaust particulate filter;
  prohibiting a fuel cut during deceleration when the exhaust particulate deposition amount and the temperature meet a predetermined excessive temperature rise condition; and
  performing a temporary oxygen supply to the exhaust particulate filter when a predetermined release condition is further satisfied during the fuel cut prohibition,
  wherein a condition in which the temperature of the exhaust particulate filter is less than a predetermined temperature higher than a temperature threshold value in the excessive temperature rise condition and lower than a predetermined release end temperature is included in the release condition,
  wherein the predetermined temperature is a temperature at which an excessive temperature rise of the exhaust particulate filter does not occur if the fuel cut is performed in a short time, and wherein the predetermined release end temperature is a temperature at which the excessive temperature rise of the exhaust particulate filter does not occur, in consideration of a temperature rise which occurs lagging behind an ending of the fuel cut.

2. The method for controlling the internal combustion engine according to claim 1, wherein, by using the exhaust particulate deposition amount and the temperature as parameters, the excessive temperature rise condition is defined so as to have a characteristic in which the larger the exhaust particulate deposition amount becomes, the lower a temperature threshold value becomes.

3. The method for controlling the internal combustion engine according to claim 1, wherein a number of times of the temporary oxygen supply is limited to a predetermined number of times or less in one time of coast travel.

4. The method for controlling the internal combustion engine according to claim 1, wherein a continuation time in one time of the temporary oxygen supply is limited to a predetermined time.

5. The method for controlling the internal combustion engine according to claim 1, wherein, after performing the temporary oxygen supply, a next temporary oxygen supply is prohibited until a predetermined time elapses.

6. The method for controlling the internal combustion engine according to claim 1, wherein the temporary oxygen supply is performed by any one of a fuel cut of all cylinders, a fuel cut of a part of the cylinders and secondary air supply.

7. The method for controlling the internal combustion engine according to claim 1, wherein a condition in which the exhaust particulate deposition amount of the exhaust particulate filter is less than a predetermined deposition amount larger than a deposition amount threshold value in the excessive temperature rise condition is included in the release condition.

8. A device for controlling an internal combustion engine which performs combustion mainly at a theoretical air-fuel ratio and is provided with an exhaust particulate filter disposed in an exhaust passage,
    wherein an exhaust particulate deposition amount and a temperature of the exhaust particulate filter are detected or estimated, and when the exhaust particulate deposition amount and the temperature meet a predetermined excessive temperature rise condition, a fuel cut during deceleration is prohibited,
    wherein during the prohibition of the fuel cut, when a predetermined release condition is satisfied further, a temporary oxygen supply to the exhaust particulate filter is performed,
    wherein a condition in which the temperature of the exhaust particulate filter is less than a predetermined temperature higher than a temperature threshold value in the excessive temperature rise condition and lower than a predetermined release end temperature is included in the release condition,
    wherein the predetermined temperature is a temperature at which an excessive temperature rise of the exhaust particulate filter does not occur if the fuel cut is performed in a short time, and
    wherein the predetermined release end temperature is a temperature at which the excessive temperature rise of the exhaust particulate filter does not occur, in consideration of a temperature rise which occurs lagging behind an ending of the fuel cut.

* * * * *